United States Patent [19]

Evans

[11] 4,081,110
[45] Mar. 28, 1978

[54] FLEXIBLE MEMBRANE DISCHARGE FOR VACUUM HOPPER

[75] Inventor: Arthur J. Evans, Northville, Mich.

[73] Assignee: Whitlock, Inc., Farmington Hills, Mich.

[21] Appl. No.: 756,267

[22] Filed: Jan. 3, 1977

[51] Int. Cl.² .............................................. B65G 65/72
[52] U.S. Cl. ...................................... 222/203; 302/21
[58] Field of Search .......................... 222/195, 199–200, 222/202, 203, 226; 302/21, 23

[56] References Cited

U.S. PATENT DOCUMENTS

| | | | |
|---|---|---|---|
| 2,792,262 | 5/1957 | Hathorn | 222/203 X |
| 3,620,575 | 11/1971 | McIver et al. | 302/21 X |
| 3,841,530 | 10/1974 | Janninck | 222/203 X |
| 4,005,908 | 2/1977 | Freeman | 302/23 X |

FOREIGN PATENT DOCUMENTS

| | | | |
|---|---|---|---|
| 215,932 | 1/1958 | Australia | 222/195 |
| 2,222,280 | 3/1973 | France | 222/203 |

*Primary Examiner*—Robert B. Reeves
*Assistant Examiner*—Charles A. Marmor

*Attorney, Agent, or Firm*—Kinzer, Plyer, Dorn & McEachran

[57] ABSTRACT

A vacuum storage hopper for storing and dispensing granular materials, including a storage chamber having a lower inverted conical discharge section terminating in a discharge valve. At least one material inlet and a combination air inlet-outlet are connected to the upper part of the storage chamber. A source of air under vacuum and pressure is connected to the air inlet-outlet for exhausting air from the storage chamber to draw granular material thereinto, and for supplying air under pressure to the storage chamber to assist the discharge of granular material from the hopper. A flexible, resilient air-impervious membrane of inverted generally conical configuration is located in the discharge section of the hopper; the membrane has its upper edge secured to the upper edge of the discharge section of the hopper and hangs downwardly therefrom. A short strip of the membrane, no more than a minor fraction of its circumference, is secured to the storage chamber below its upper edge. A port in the discharge section of the storage chamber is used to introduce air under pressure between the wall of the storage chamber and the membrane at a point above the strip of membrane and below its upper edge.

2 Claims, 2 Drawing Figures

FLEXIBLE MEMBRANE DISCHARGE FOR VACUUM HOPPER

BACKGROUND OF THE INVENTION

Vacuum conveying systems are in widespread use in both industrial and agricultural establishments for handling dry bulk materials such as powders and pellets. These conveying systems can move dry bulk materials through closed dust-free systems at rates ranging from a few hundred pounds per hour up to virtually any requirement. Vacuum storage hoppers form an important part of such systems. A vacuum storage hopper is usually installed over a larger storage bin or over processing equipment where it directly feeds a machine hopper. In such cases, the machine hopper is usually equipped with a level control to maintain an adequate supply of the dry bulk material for the machine.

In order to move the dry bulk material through a vacuum conveying system, a vacuum is created in the vacuum storage hopper. The vacuum may be created in any conventional way but it is usually by means of a vacuum line connection to the inlet side of a positive displacement air blower. The vacuum so created draws free flowing dry bulk material into the vacuum storage hopper through a material feed tube or pipe. A filter in the vacuum hopper cover prevents the dry bulk material from being drawn into the vacuum line. When the vacuum storage hopper is full, a timer or level sensor signals a directional control valve to switch from vacuum to air under pressure for delivery to the vacuum storage hopper. A gate or closure member in the bottom of the vacuum storage hopper is opened to discharge the material from the hopper while a flapper valve on the material feed tube closes. The pressurized air entering the hopper cleans the filter after each loading cycle and aids in emptying the material through the discharge gate in the bottom of the hopper.

Conveying systems using vacuum storage hoppers are frequently fully automated. The powders or pellets moving through the system sometime coagulate in the hopper, thereby "bridging" or obstructing the discharge outlet. When this happens, the processing machine feed is cut off and the processing machine is automatically stopped. An attendant must then diagnose the trouble and correct the cause of the interruption of material flow. The problem of "bridging" of coherent material in the discharge of storage hoppers has long been recognized and various solutions have been proposed. One readily apparent solution is to increase the pressure of the air introduced into the vacuum storage hopper to force out the material. Safety requirements, however, limit the pressure of the air that can be introduced in the hopper and this method alone has not been successful.

Another proposed solution to this problem involved the use of a flexible liner in the storage hopper which could be flexed to break up obstructions. U.S. Pat. No. 3,346,917 to Lennox shows a flexible liner 33 installed in the discharge cone of a hopper. The liner is sealed at its top and bottom to the hopper wall. Air under pressure is introduced in the space between the liner and the hopper wall 24 through a valve 37 and a conduit 36. A control 38 for the valve 37 limits the inward flexure of the liner and the flexing of the liner is used to release jams and bridging.

Another approach to the problem of "bridging" is shown in U.S. Pat. No. 3,115,369 issued to Bozich. A membrane 36 is installed as a liner for the conical wall portion of a hopper and the membrane is sealed at its top and bottom edges to the hopper wall. The membrane is porous so that air can be forced through it to aerate the contents of the hopper. Air can also be introduced at the top of the hopper. However, an interlock is provided to prevent air from being introduced simultaneously into the top of the hopper and between the hopper wall and membrane.

Davis U.S. Pat. No. 2,732,099 and Hartman U.S. Pat. No. 3,079,018 both disclose hoppers that utilize plural air inflated "bumpers" in the bottom portions of the hopper cones to avoid "bridging." The Davis patent expressly provides for periodic inflation and deflation of the bumpers.

Carter U.S. Pat. No. 2,756,906 has an internal liner 31 in the cone of a hopper, rather like that shown in the Lennox patent, with a plurality of sealed rubber tubes 36 located between the liner and the hopper wall 30. The space between the liner and the wall 30 is periodically evacuated through a vacuum line 37.

Emery et al U.S. Pat. No. 3,367,723 shows an aerating device that uses a rigid perforated wall 22 to introduce air into the contents of a hopper from the bottom thereof.

None of the previously described mechanisms or methods have been completely successful in preventing jamming or bridging of powders or pellets in the discharge outlet of vacuum storage hoppers.

SUMMARY OF THE INVENTION

Accordingly, the present invention is directed to a new and improved vacuum storage hopper for storing and dispensing dry bulk materials which inherently eliminates or minimizes the aforementioned difficulties encountered in prior art systems.

A particular object of the present invention is to provide a new and improved vacuum storage hopper for storing and dispensing dry bulk materials having a flexible resilient membrane which hangs freely in the conical discharge section of the storage hopper so that it can readily flutter when air under pressure is introduced between the membrane and the storage hopper wall to dislodge any obstruction or "bridging" of dry bulk material in the storage hopper discharge.

Another object of this invention is a vacuum storage hopper in which the discharge of materials is assisted by air pressure applied to the upper surface of the material and between the liner and the wall of the discharge section of the storage hopper.

A particular object of the invention is a vacuum storage hopper having a flexible resilient membrane of inverted generally conical configuration in which only its upper edge and a short strip of the remainder of the membrane, no more than a minor fraction of its circumference, are secured to the wall of the discharge section of the storage hopper.

Accordingly, the invention relates to a vacuum storage hopper for storing and dispensing granular materials of the kind comprising a storage chamber having a lower inverted conical discharge section which terminates in a discharge valve. At least one material inlet and a combination air inlet-outlet are provided in the upper part of the storage chamber. Sources of air under vacuum and pressure are connected to the air inlet-outlet for exhausting air from the storage chamber to draw granular material therein and to supply air under pressure to the storage chamber to assist the discharge of granular material from the hopper through the discharge valve. In order to prevent "bridging" at the discharge, a flexible resilient membrane of inverted generally conical configuration is installed in the discharge section of the storage chamber. The membrane has its upper edge secured to the upper edge of the discharge section of the storage chamber and extends therein with the lower edge of the membrane hanging freely. Means are provided to introduce air under pressure between the wall of the storage chamber and the membrane to create a fluttering of the membrane to release any material obstructions in the discharge section of the storage chamber. A short strip of the membrane, no more than a minor fraction of its circumference, is secured to the discharge section of the storage chamber immediately below the air introduction port to divert the air circumferentially around the storage chamber wall, between that wall and the membrane.

BRIEF DESCRIPTION OF THE DRAWINGS

The invention is illustrated more or less diagrammatically in the following drawings wherein.

DESCRIPTION OF THE PREFERRED EMBODIMENT

Figures 1, 2:
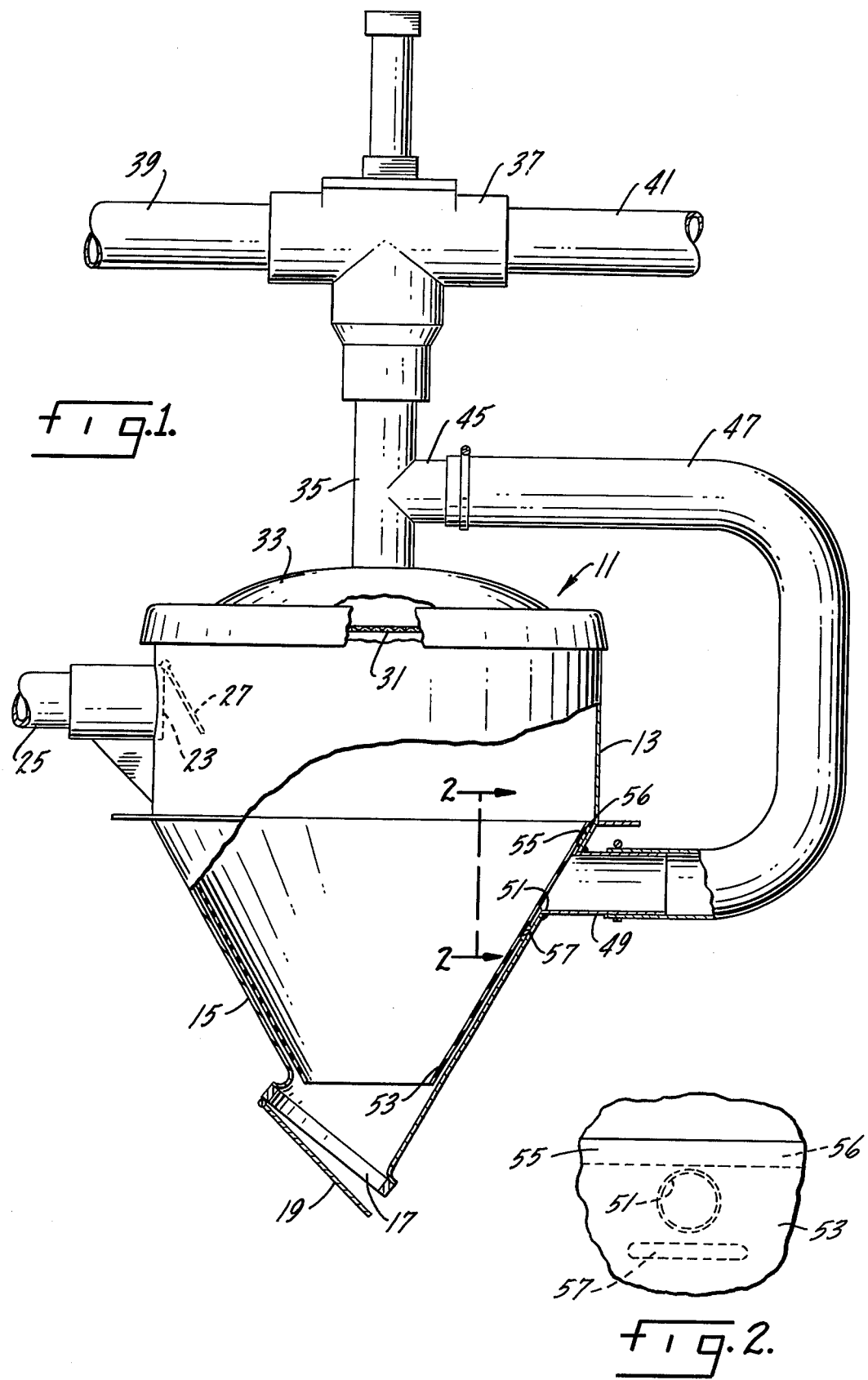
FIG. 1 is an elevational view, partly in cross section and with parts broken away, of a vacuum storage hopper constructed in accordance with the teachings of this invention.
FIG. 2 is a partial view taken along lines 2—2 of FIG. 1.

FIG. 1 of the drawings shows a vacuum storage hopper and associated piping and valving incorporating the novel concepts of this invention. The hopper 11 has a cylindrical upper section 13 mounted on a frusto-conical lower section 15. The frusto-conical lower section 15 of the hopper 11 terminates at its lower end in a generally circular outlet 17. A gate or closure member 19 is provided for this outlet. Although, for clarity of illustration, the gate is shown in the drawings as a hinged flapper, it should be understood that a gate of this type which is conventionally installed on a hopper is equipped with a mechanism for positively holding the gate closed and moving it to and from its open position. The outlet 17 of the hopper usually discharges to a larger storage bin or to the hopper of a machine or other piece of processing equipment. These devices are not shown for simplicity of illustration. An inlet opening 23 for a dry bulk material feed tubing or line 25 is formed in the cylindrical upper section 13 of the hopper. A flapper type closure valve 27 is located in the hopper to control the inlet opening; other valves can be used.

A filter 31 is mounted on the upper end of the cylindrical section 13 of the hopper 11 and is clamped to the hopper by a cover 33 which covers the top of the hopper. The cover fits closely over a gasket, which is not shown, to seal the upper portion of the hopper. A pressure mounting for the cover 33, which is not shown in the drawings, is utilized to insure an effective seal for the hopper. A conventional clamp mechanism, which is well known in the art, can be utilized for this purpose.

A combination vacuum and pressure conduit or line 35 leads into the hopper 11 through the cover 33. Flow through the combination vacuum and pressure line is controlled by a two-way valve 37 which connects to a vacuum conduit or line 39 and a pressurized air conduit or line 41. The two-way valve 37 may be pneumatically, hydraulically or electrically controlled. As previously mentioned, the vacuum conduit may be connected to the inlet side of a positive displacement air blower and the pressurized air conduit may be connected to the outlet side of the same blower. The vacuum pressure conduit 35 leading into the cover 33 may be a T fitting having an outlet leg 45. A U-shaped pipe 47 connects to the outlet leg 45 and to a stub pipe 49 leading into an air inlet port 51 in the frustoconical lower portion 15 of the hopper.

A frusto-conical air-impervious flexible membrane 53 is positioned inside the lower portion 15 of the hopper 11. The membrane, which may be formed of rubber or a suitable plastic, is attached to the hopper only at the upper edge 55 of the membrane. This edge of the membrane may be adhered to the hopper by a suitable adhesive 56 (FIG. 2); other suitable means may be used as desired. A short strip of the membrane located just below the opening 51 into the frusto-conical lower section of the hopper is also adhered to the hopper, as by a suitable adhesive 57. Due to this unique means of support, the frusto-conical shaped membrane 53 hangs relatively freely in the frusto-conical lower portion 15 of the hopper.

When the two-way valve 37 is operated so as to connect the vacuum conduit 39 with the combination vacuum and pressure conduit 35, air is withdrawn from the hopper 11 through the filter 31 and through the U-shaped pipe 47. However, almost as soon as a vacuum is created in the U-shaped pipe 47, the membrane 53 closes the port 51 leading into the pipe. The vacuum created in the hopper 11 opens the flapper valve 27 in the dry bulk material feed conduit 25, thereby drawing material into the hopper through the dry bulk material feed conduit 25. With the gate 19 in its closed position, the dry bulk material will fill the frusto-conical portion 15 of the hopper 11 and may partially fill the upper cylindrical portion 13 of the hopper. The filter 31 prevents the dry bulk granular material or dust from being drawn into the vacuum conduit 39.

When suffficient dry bulk material has been drawn into the hopper to fill it, which condition can be determined by a timing mechanism or other suitable device, the two-way valve 37 is actuated to disconnect the vacuum conduit 39 from continuity with the combination vacuum and pressure conduit 35 and to connect the pressurized air conduit 41 with the conduit 35. The gate 19 on the hopper outlet 17 may then be opened to discharge the dry bulk granular material into a storage bin or processing machine hopper. Air from the pressurized air conduit 41 moves into the hopper 11 through the conduit 35 to assist in discharge of the dry bulk material from the hopper. The pressurized air flushes dust and particles from the filter 31. The air also flows through the pipe 47 to enter the opening 51 in the lower portion 15 of the hopper, thereby acting against the membrane 53. It has been found that the application of air under pressure against the membrane causes a fluttering of the membrane, which loosens any dry granular material which tends to bridge across or clog the outlet 17 of the hopper.

The adherence of a short strip of membrane 53 to the hopper immediately below the opening 51 in the frusto-conical portion of the hopper seems to aid in inducing a fluttering action of the membrane and thus assists in dislodging bridged granular material in the hopper. Apparently, the strip 55 of the membrane adhered to the hopper wall directs the pressurized air flowing through the opening 51 to flow horizontally. This horizontal flow aids in the fluttering of the membrane 53, which is hanging more or less freely in the lower frusto-conical end of the hopper, being otherwise held only by the seal along its upper edge.

In a large hopper, it may be desirable to provide an additional air inlet port 51 at the other side of the discharge section 15 to assure full and consistent bridge-breaking capability, though one such inlet is usually adequate. Of course, a separate air supply could be used for the air inlet 51. However, the illustrated arrangement, with port 51 connected directly to the hopper air inlet-outlet line 35 by pipe 47, is far more economical yet highly effective; particularly due to the action of the membrane 53 in closing the port 51 for vacuum conditions in line 47.

I claim:

1. In a vacuum storage hopper for storing and dispensing granular materials, of the kind comprising a storage chamber having a lower inverted conical discharge section terminating in a discharge valve, at least one material inlet and an air inlet-outlet in the upper part of the storage chamber, and vacuum-pressure means, connected to the air inlet-outlet, for exhausting air from the storage chamber to draw granular material thereinto and for supplying air under pressure to the storage chamber to assist the discharge of granular material from the hopper through the discharge valve, de-bridging means comprising:

a flexible, resilient, air-impervious membrane of inverted generally conical configuration having its upper edge sealed to the upper edge of the discharge section of the storage chamber and extending downwardly therein with the lower portion of the membrane hanging freely within the discharge section and having its free edge terminating a short distance above the discharge valve, and membrane actuation means, including at least one air inlet port opening into the discharge section of the chamber, for introducing air under pressure between the wall of the storage chamber and the membrane to create a fluttering of the membrane, a short strip of the membrane, no more than a minor fraction of its circumference, being secured to the discharge section of the storage chamber immediately below the air inlet port to divert the air circumferentially around the storage chamber wall, between that wall and the membrane.

2. In a vacuum storage hopper for storing and dispensing granular materials, of the kind comprising a storage chamber having a lower inverted conical discharge section terminating in a discharge valve, at least one material inlet and an air inlet-outlet in the upper part of the storage chamber, and vacuum-pressure means, connected to the air inletoutlet, for exhausting air from the storage chamber to draw granular material thereinto and for supplying air under pressure to the storage chamber to assist the discharge of granular material from the hopper through the discharge valve, de-bridging means comprising:

a flexible, resilient, air-impervious membrane of inverted genrally conical configuration having its upper edge sealed to the upper edge of the discharge section of the storage chamber and extending downwardly thereinto with the lower portion of the membrane hanging freely within the discharge section and having its free edge terminating a short distance above the discharge valve, a short strip of the membrane, no more than a minor fraction of its circumference, being sealed to the upper portion of the discharge section of the storage chamber at a level below its upper edge;

and membrane actuation means to introduce air under pressure between the wall of the storage chamber and the membrane, the membrane actuation means comprising a conduit connected from the air inlet-outlet for the storage hopper to a de-bridging air inlet port extending through the storage chamber wall at a point above the strip and below the upper edge of the membrane, whereby the membrane is pulled toward the de-bridging air inlet port to seal that port whenever the hopper is being filled, and air is supplied under pressure and directed around the periphery of the discharge section, between the chamber wall and the membrane, to cause the membrane to flutter and preclude bridging, whenever the storage hopper is being discharged.

* * * * *